Sept. 13, 1949.   R. ROMAN   2,481,784
MASTER PIN FOR ENDLESS TRACK MECHANISM
Filed July 26, 1948
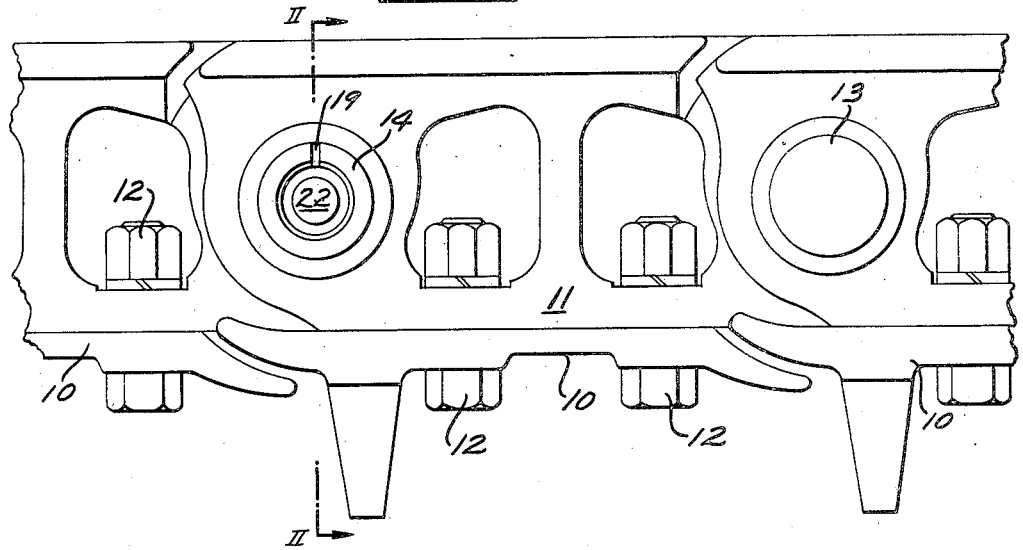
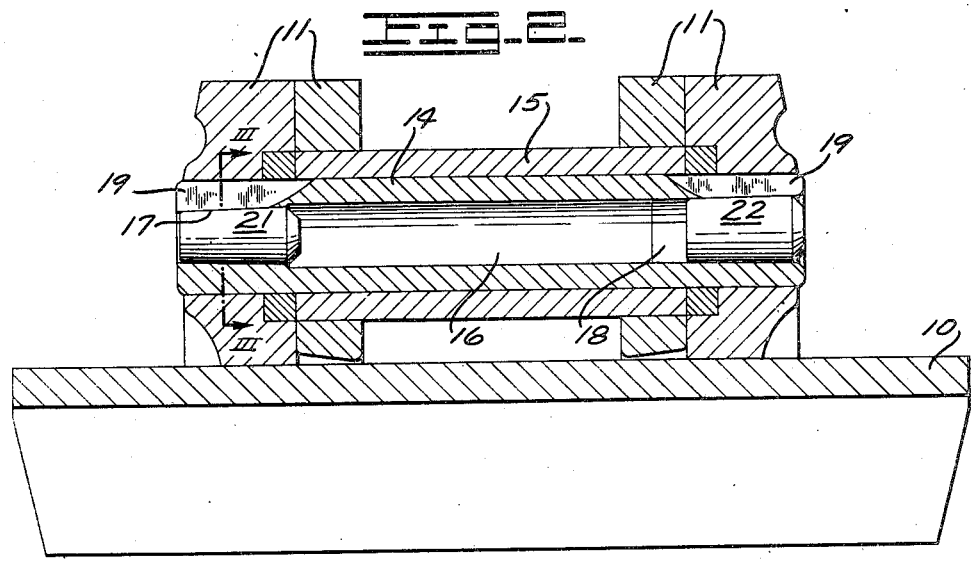
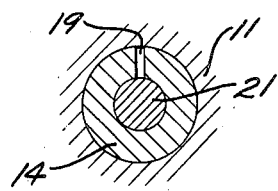
INVENTOR.
Randall Roman
BY
Charles M. Fryer
ATTORNEY.

Patented Sept. 13, 1949

2,481,784

UNITED STATES PATENT OFFICE 2,481,784

MASTER PIN FOR ENDLESS TRACK MECHANISM

Randall Roman, Peoria, Ill., assignor to Caterpillar Tractor Co., Peoria, Ill., a corporation of California Application July 26, 1948, Serial No. 40,664

5 Claims. (Cl. 74—251)

This invention relates to master pins or removable pins of the kind used in chains and other articulated devices. The invention is adapted for use with the articulated endless track of a track-type vehicle and will be described herein by reference to such use though its application in other environments will be readily appreciated from this description.

In an endless track for track-type vehicles comprising a plurality of track shoes pivotally connected by means of pins, it is conventional practice to provide one master pin in each track assembly which can be readily removed separating the track thus permitting its removal from the vehicle. Usually such master pins are provided with a suitable recess in each end of the pin for the reception of a tapered plug, which when driven into the recess causes the track pin to expand forming a tight fit with the associated track shoe. Each plug is provided with a threaded socket for the reception of a suitable puller for removing the plugs from the master pin prior to removal of the track from the vehicle. Due to the environment in which the track operates, the plugs often become corroded and are difficult to remove. Even under the most satisfactory conditions, a special puller is required which is often not available in the field.

It is, therefore, an object of this invention to overcome the above-mentioned difficulties by providing a master track pin, the ends of which can be expanded or contracted by means of tapered plugs arranged in such a manner that they can be removed by means of a simple drift or punch. Other objects and advantages of this invention are made apparent in the following specification wherein reference is made to the accompanying drawings.

In the drawings:

Fig. 1 is a side elevation of a part of an endless track mechanism illustrating the manner in which the ends of the track may be connected by means of the present invention, Fig. 2 is a sectional view taken along line II—II of Fig. 1, and Fig. 3 is a sectional view taken along line III—III of Fig. 2.

Fig. 1 of the drawings illustrates a part of a track mechanism comprising a plurality of ground engaging track plates 10, each of which is rigidly secured to a pair of spaced parallel track links 11 as by bolts 12. Each pair of track links is pivotally connected by means of track pins 13 to an adjacent and cooperating pair of links in such a manner that a chain is formed. The ends of the chain are pivotally connected by means of a master pin, illustrated at 14, forming an endless chain which is adapted to be trained over a drive sprocket and idler sprocket as is customary in a track-type vehicle. It is to the construction of this master pin that this invention is directed.

As is best illustrated in Fig. 2, the master pin 14 is disposed within suitable apertures provided in the track links 11, forming a pivotal connection between the links on adjacent track plates. A track pin bushing 15, the ends of which are pressed into suitable openings in one pair of track links, is disposed about the track pin, and serves as a spacer between the track links, as well as acting as a bearing to permit rotation of the track pin.

Pin 14 is provided with an axial bore 16, the ends of which terminate in tapered seats 17 and 18. Slots 19 are provided at the ends of the pin in positions to intercept the tapered seats and to permit the ends of the pin to be expanded. The seat 17 is adapted to receive a tapered plug 21, the maximum diameter of which is less than the diameter of the bore 16, permitting it to be inserted in the seat 17 from the opposite end of the pin through the bore 16. The plug 21 is then forced outwardly, causing the end of the pin to be expanded forming a tight fit with the track link embracing this part of the pin. The seat 18 is adapted to receive a tapered plug 22 having a minimum diameter as great or greater than that of the bore 16. When the plug 22 is forced inwardly into the seat 18, the adjacent end of the track pin is expanded forming a tight fit with its cooperating outer track link.

When it is desired to remove the master pin 14 in order to separate the track chain, the tapered plug 21 may be driven from its seat by means of a suitable drift or punch permitting the adjacent end of the track pin to be contracted. The tapered plug 22 is removed in the same manner by continuing to force the plug 21 toward it. With this new and improved construction of the master pin, the expanding plugs can be easily removed, regardless of condition, without the necessity of special tools of any kind.

The tapered seats 17 and 18 are for convenience preferably made as parts of the same taper and obviously the wall of the taper could be continued throughout the entire length of the pin though manufacturing considerations indicate the construction shown as preferable.

The invention described herein is adaptable to any hinge-like joint and is particularly desirable for use in corrosive environments where difficulty in disassembly of the parts is likely to occur.

I claim:

1. A hollow hinge pin or the like having bearing support adjacent its opposite ends comprising seats for tapered plugs adjacent each end of the hinge pin for expanding its ends, said seats being tapered in the same direction and a plug received by one seat of a size to pass freely though the hollow pin and the other seat.

2. A hollow hinge pin having expandable ends for engagement with supporting bearings comprising a tapered plug adapted to fit in each end to expand it, one of said plugs being larger than the other and both being received with their seats in the same direction whereby the smaller plug may be unseated and driven out through the hollow pin.

3. A hollow hinge pin having expandable ends for engagement with supporting bearings comprising a tapered plug adapted to fit in each end to expand it, said pin having seats for said plugs adjacent its end and formed as a continuation of the same taper whereby a small plug will fit one end and a larger plug the other end.

4. A hollow hinge pin having expandable ends for engagement with supporting bearings comprising a tapered plug adapted to fit in each end to expand it, said pin having seats for said plugs adjacent its end and formed as a continuation of the same taper whereby a small plug will fit one end and a larger plug the other end and whereby both plugs may be removed by driving the small plug in the direction of its large end.

5. A hollow pin with expandable ends, a tapered plug for each end, one plug being smaller than the other and the tapers converging in the same direction and toward the end with the smaller plug.

RANDALL ROMAN.

REFERENCES CITED

The following references are of record in the file of this patent:

UNITED STATES PATENTS

| Number | Name | Date |
|---|---|---|
| 1,393,139 | Kiesel, Jr. | Oct. 11, 1921 |

FOREIGN PATENTS

| Number | Country | Date |
|---|---|---|
| 824,204 | France | Nov. 3, 1937 |